United States Patent [19] [11] 4,408,922
D'Alessio [45] Oct. 11, 1983

[54] COUPLER

[75] Inventor: Michael S. D'Alessio, Flushing, N.Y.

[73] Assignee: Harsco Corporation, Camp Hill, Pa.

[21] Appl. No.: 232,318

[22] Filed: Feb. 6, 1981

[51] Int. Cl.³ .............................................. F16B 2/02
[52] U.S. Cl. .................................... 403/12; 403/387;
403/400
[58] Field of Search ............... 403/386, 387, 400, 385,
403/398, 12; 248/68 CB

[56] References Cited

U.S. PATENT DOCUMENTS 2,511,035 6/1950 Barton ................................ 403/385

FOREIGN PATENT DOCUMENTS

1036569 8/1978 Canada ................................ 403/400
947229 1/1949 France ................................ 403/385
1041031 5/1953 France ................................ 403/385
1338085 11/1973 United Kingdom ................ 403/386

Primary Examiner—Andrew V. Kundrat
Attorney, Agent, or Firm—Curtis, Morris & Safford

[57] ABSTRACT

A coupler (for joining tubing to a shoring leg or the like, having a T-shaped bolt slot extending along the length of such leg) is formed of a sickle-shaped metal strap or extrusion, having a C-shaped central portion, a radial extension portion at one end, and a tangential T-portion at the other end, said T-portion being formed of a head and a relatively narrow neck with adjacent opposing shoulders; and a T-bolt secured through a hole in the extension portion. The head and shoulders defining the neck of the T-portion are spaced and shaped so as readily to accommodate therebetween the lips forming the T-slot when the T-portion is inserted generally perpendicularly into the T-slot and yet grippingly bite into said lips when the coupler falls into the cocked open position. This permits the coupler provisionally to cradle and hold the tubing in place before the T-bolt is fastened. Advantageously, the coupler is hinged between the C-portion and the T-portion, thereby assuring that the T-portion continuously grips against vertical movement in the vertically disposed T-slot, even during fastening of the T-bolt.

31 Claims, 13 Drawing Figures

COUPLER

BACKGROUND OF THE INVENTION

1. Field of the Invention

This invention is directed to tubing couplers or clamps, and is particularly directed to couplers for joining a length of tubing or other bracing to a shoring or scaffolding frame, stanchion, beam, or similar member.

2. Brief Description of the Prior Art

It is conventional in the shoring, scaffolding, and forming arts to use a horizontal tube or brace to join two or more stanchions together for their mutual support. Normally, such braces are held in place on the stanchions by means of double hinged couplers having one side clamped around the stanchion and the other side clamped around the brace. Each side of the conventional coupler includes a hinged member that is secured by a bolt respectively around a brace and a stanchion. Because the coupler must be bolted around both the stanchion and the brace, it is therefore tedious and time-consuming for a workman to make such installations. Typically, during installation, coupler bolts must be tightened down when at least one end of the horizontal brace is in place. Thereafter, the position of the brace on the stanchions may have to be adjusted by loosening the bolt on one stanchion, adjusting the position of the coupler thereon, and retightening the bolt, and then loosening the bolt on the other stanchion, adjusting the position of that coupler, and retightening that bolt. This work may often have to be done at some distance above the ground, requiring several ascents in order to adjust a single pair of couplers. The amount of work required to install a brace is a decided inconvenience and drawback to such conventional technique, particularly when executed by a single workman. This is aggravated because conventional coupling devices do not provide any means for provisionally holding the couplers in place while the height of the horizontal brace is adjusted at its other end.

T-channels or bolt slots have been used for years as a fastening means for bolts, especially in aluminum extrusions. Such channels or slots have been used in the shoring art for at least a decade on such things as flying forms and horizontal wall forms and, more recently, on shoring frames (for example as described in this inventor's copending application Ser. No. 185,761, filed Sept. 10, 1980). However, to the best of the inventor's belief, no coupler has ever been developed to utilize such channels or slots, much less to realize the special advantages and objectives described below in connection with the uniquely simple device embodying my invention.

OBJECTS AND SUMMARY OF THE INVENTION

It is an object of this invention to provide a simplified, low cost coupler for joining a brace to a shoring or scaffolding stanchion which avoids the drawbacks of conventional couplers.

It is another object of this invention to provide a coupler for use with a stanchion or the like having a T-slot therein which permits a brace or similar generally horizontal bracing member to be quickly and easily installed on such stanchion.

It is still another object of this invention to provide a coupler having means provided therein for provisionally holding the coupler with a brace in place and preventing the coupler from sliding in the T-slot until the coupler can be secured in the T-slot, thus enabling convenient installation by a single laborer.

According to one preferred embodiment of this invention, there is provided a coupler for joining a length of tubing to a shoring stanchion or the like of the type having a T-slot extending therealong. Such a T-slot is conventionally adapted to receive the head and a portion of the shank of a bolt.

In the simplified version of the coupler of this invention, the coupler body is preferably a sickle-shaped steel strap or aluminum extrusion, formed of a central collar, a tangentially extending first end (formed as a T-shaped member), and a radially extending second end (having a hole therein to receive a bolt).

The bolt may be advantageously formed with a T-head, or equivalent [see for example the T-bolt illustrated in the aforementioned application Ser. No. 185,761, filed Sept. 10, 1980 and my co-assigned copending application Ser. No. 231,493, filed Feb. 4, 1981 the descriptions of which are incorporated herein by reference]. The collar preferably is semi-circular, being adapted to fit part way around the circumference of a round tubular brace and hold the same against the T-slotted stanchion.

The first end of the coupler is adapted to be inserted into the T-slot and turned to securely catch and hold said first end in the T-slot sufficiently to support the horizontal brace, even in the open position.

The coupler in the preferred embodiment of this invention includes a biting means, such as a shoulder formed as part of the T-shaped engaging means at the first end of the collar, for gripping the lips forming the T-slot (and perhaps also the base of the T-slot) and preventing the coupler from sliding in the T-slot until the T-bolt (or other securing means) has been secured in place in the in the T-slot. Thus, the coupler can be provisionally held in place in a semi-open position while supporting the tubing before the T-bolt has been secured.

The engaging means advantageously includes a T-shaped member having a head portion and a neck portion connecting the first end of the collar thereto. The head portion and the neck portion are respectively broader and narrower in length than the entry channel portion of the T-slot, with both being thinner in width than the entry channel portion of the T-slot. The securing means of the coupler can include a T-bolt having an elongated head portion adapted to be inserted into the T-slot and, when twisted a predetermined amount, to be held securely in the T-slot. The T-bolt can also have a threaded shank portion extending from the head portion. This T-bolt is mounted through a hole in the second end of the collar and can be held in place by a threaded nut.

In an improved embodiment of the coupler according to this invention, the engaging means is articulately coupled, e.g., by a hinge, to the collar portion of the coupler. With this arrangement, the weight of the tubing cradled in the open collar assures that the T-shaped member and shoulder (or other biting portions of the engaging means) are held in a biting relation to lips of the T-slot as the T-bolt, or other securing means, is tightened to bring the tubing and coupler securely against the T-slot. The collar and engaging means can each have corresponding eyes formed therein, for example by forging or by extruding, through which a pin passes to form a hinge. A spur can then be disposed on one of the eyes to abut against one of the elements (for example, the collar), to limit angular travel of the hinge; so that the collar is sufficiently open to permit a bracing tube to be laid therein, but not so open that the tube will not be adequately cradled.

DETAILED DESCRIPTION OF THE PREFERRED EMBODIMENTS

Figure 1:
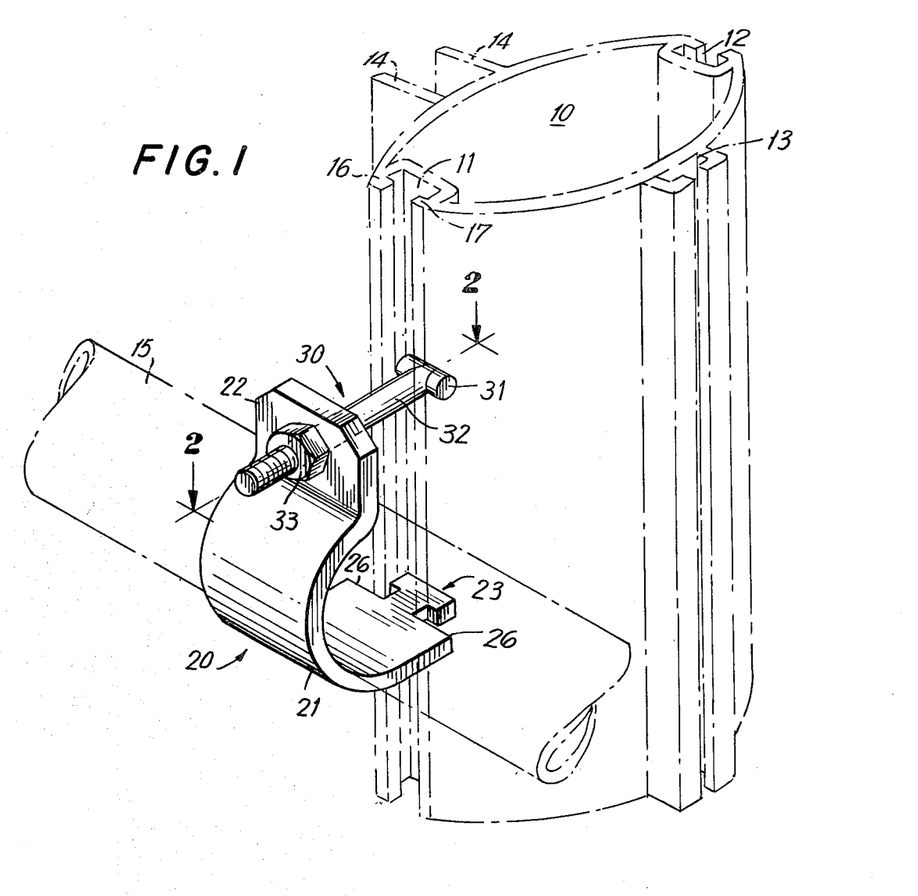
FIG. 1 is a perspective view of a preferred embodiment of the coupler according to this invention showing in phantom outline the horizontal bracing tube fixed in place on the vertical stanchion.

With reference to the drawing figures, and initially to FIG. 1, an embodiment of the coupler according to this invention is shown in conjunction with a section of a shoring stanchion 10. Stanchion 10 is elongated, in cross-section, for optimum load bearing characteristics, and has T-slots 11, 12, 13 formed therein and extending the length thereof. In addition, sacrificial flanges 14 are provided so that shoring or scaffolding elements can be welded to stanchion 10. Preferably, stanchion 10 is formed of aluminum in order to afford a substantial reduction in weight and thereby to effect time and cost savings in construction and transport. Stanchion 10 is described in greater detail in aforementioned U.S. patent application Ser. No. 185,761.

A length of tubing 15 is to be held in place against stanchion 10 by means of a coupler mounted in T-slot 11.

Figure 2:
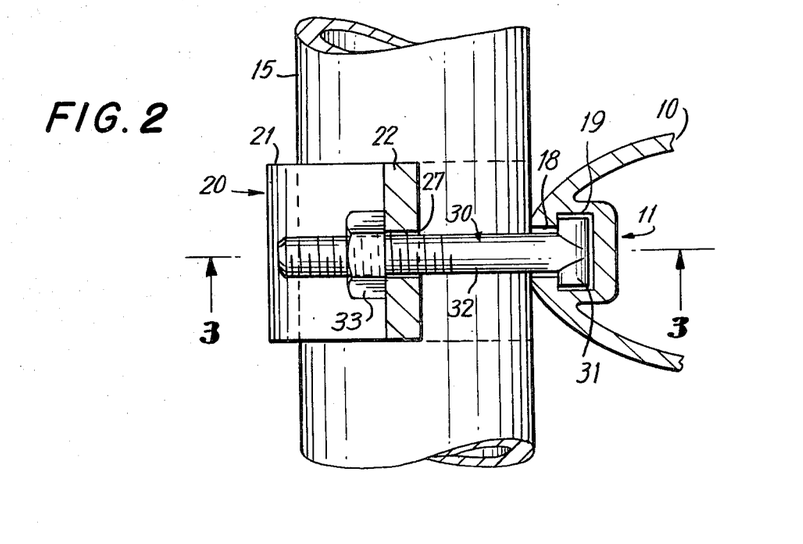
FIG. 2 is a horizontal cross-sectional view along the line 2—2 of FIG. 1.

T-slot 11 is formed with lips 16 and 17 extending toward one another to define an entry channel portion 18 (better shown in FIG. 2) and an interior channel portion 19.

Figure 3:
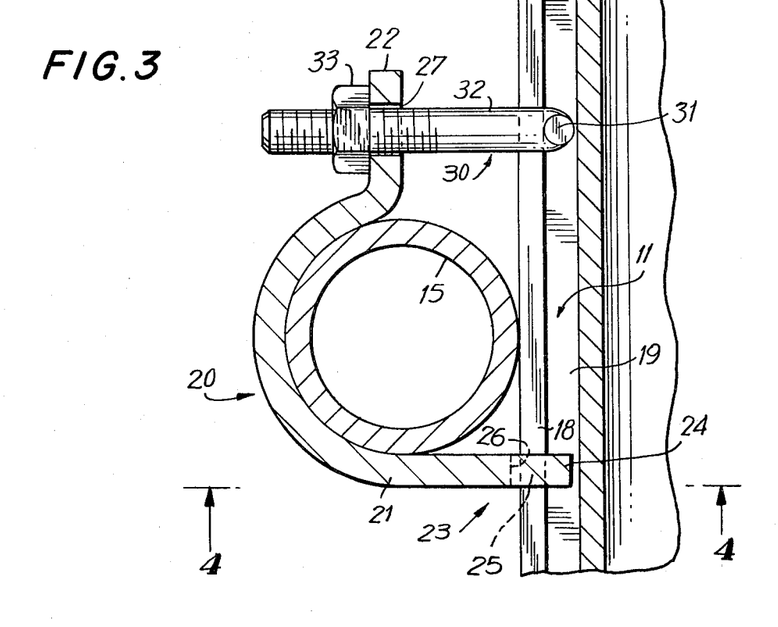
FIG. 3 is a vertical sectional view along the line 3—3 of FIG. 2.
Figure 4:
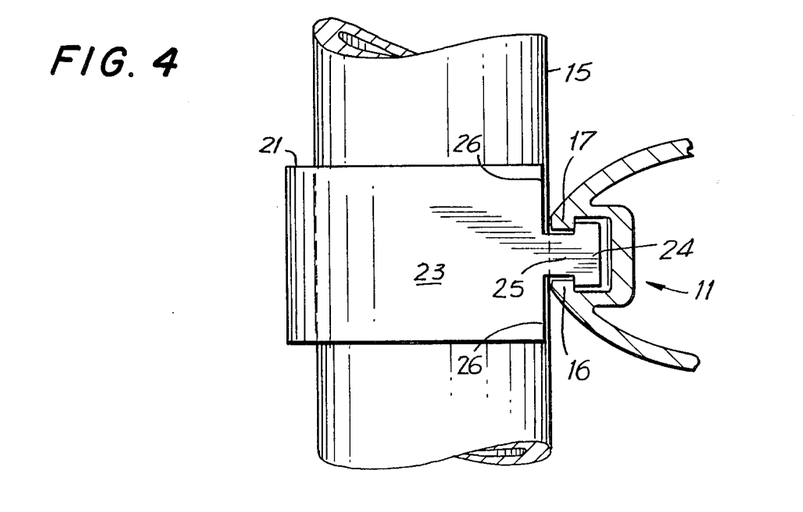
FIG. 4 is an upwardly viewed horizontal cross-section taken along the line 4—4 of FIG. 3.

In a preferred embodiment of this invention, a coupler 20 is formed of steel strapping, preferably ¼ inch thick and 1½ inches across. As best shown in FIG. 3, coupler 20 is basically drepanoid or sickle-shaped in cross-section having an arcuate or C-shaped portion 21 and an extension portion 22 at one end thereof extending radially outward. C-shaped portion 21 forms a collar adapted to engage tubing 15, which can be any convenient predetermined size, although two-inch O.D. tubing is commonly used for brace tubes. At the end of C-shaped portion 21 remote from extension portion 22 is a T-shaped tangential member 23 having a head portion 24 and a relatively narrow neck portion 25. The end of C-shaped portion 21 at the base of T-shaped member 23 extends laterally so as to form flanks or shoulders 26. Head portion 24 and neck portion 25 are dimensioned so as to fit within interior channel portion 19 and entry channel portion 18, respectively. For example, if T-slot 11 is dimensioned so that entry channel portion 18 is 2/5 inch across and 3/16 inch deep, head portion 24 can be 9/16 inch across by 7/32 inch deep, and neck portion 25 can be 3/8 inch across by 7/32 inch deep.

T-shaped member 23 thus provides an engaging means adapted to be insertable into T-slot 11 and to securely hold the lower end of C-shaped portion 21 in T-slot 11 after coupler 20 engages tubing 15.

Extension portion 22 of coupler 20 has an aperture 27 therethrough adapted to hold a T-bolt 30. As best shown in FIG. 1, bolt 30 has an elongated head portion 31 adapted to be inserted into T-slot 11 and, when twisted by 90°, to be held securely in the T-slot. T-bolt 30 also has a threaded shank portion 32 extending through aperture 27 and a threaded nut 33 for securing T-bolt 30 when in place in the T-slot. Of course, it is not essential to this invention to use a T-bolt, and other closure means, for example, an over-the-center clamp, can be used instead.

As mentioned above, in this embodiment, stanchion 10 is made of aluminum, while coupler 20 is made of steel and is thus somewhat harder than stanchion 10. Thus, shoulders 26 and head portion 24 of T-shaped member 23 cooperate with one another as a means to make a biting grip on the aluminum stanchion 10 for provisionally engaging T-slot 11 and preventing coupler 20 from sliding along stanchion 10 until T-bolt 30 has been engaged with T-slot 11.

Figure 5:
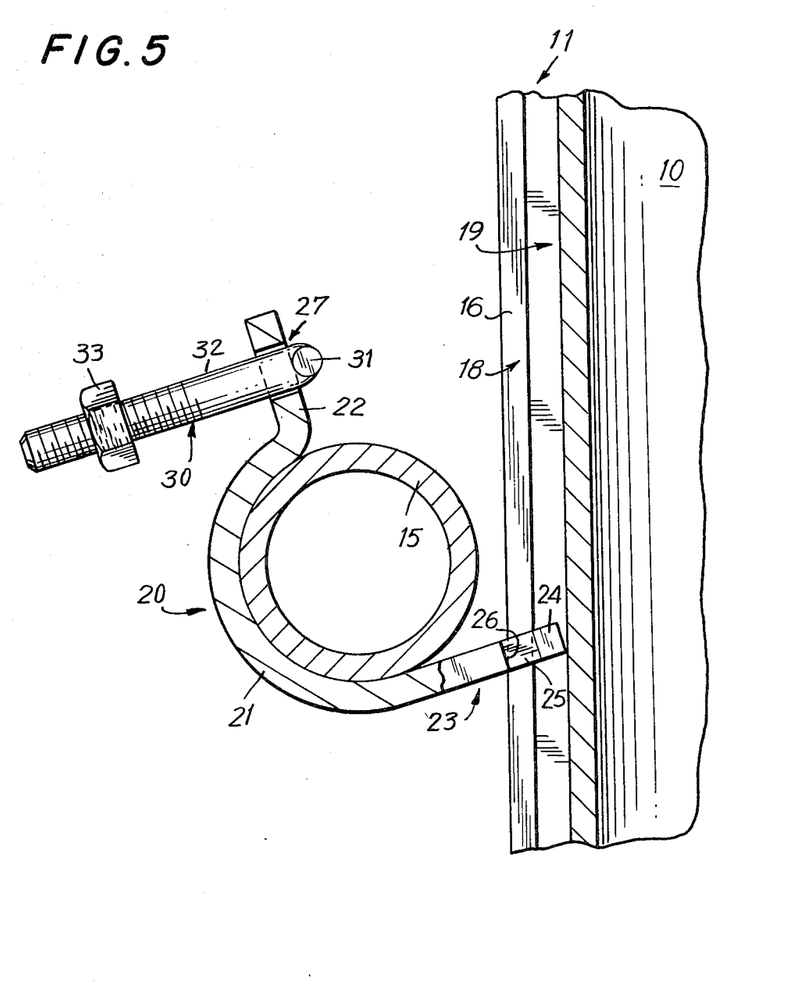
FIG. 5 is a vertical-partially sectional view, similar to that of FIG. 3, showing the same preferred embodiment; but in the open position, held in place along the stanchion by the T-head and shoulder of the engaging means biting into the lips of the T-slot.

The coupler of this invention can be used to securely and quickly install a tube to stanchion 10. Coupler 20 is mounted to stanchion 10 by turning it so that the length of the T-shaped member 23 is arranged vertically, i.e., along the direction of T-channel 11. Then, T-shaped member 23 is inserted into T-slot 11 and coupler 20 is rotated 90° until T-shaped portion 23 is horizontal. Then coupler 20 can be released, and it will cock back and assume a provisional-holding position as shown in FIG. 5. It should be observed that neck portion 25 of T-shaped member 23 is sufficiently longer than the thickness of lips 16 and 17 of T-slot 11 so that with the T-shaped member 23 perpendicular to slot 11, it is loosely engaged therein, and a workman can slide coupler 20 up or down as required. However, when coupler 20 is supported only by T-shaped member 23, the latter will be cocked back by gravity and the lower edges of shoulders 26 and the upper edges of T-shaped member 23 will cooperate to bite into the aluminum in the vicinity of T-slot 11 to hold the coupler provisionally at a selected position, generally as illustrated in FIG. 5. Length of tubing 15 can then be laid into C-shaped portion 21 of coupler 20 while a corresponding coupler is provisionally installed on another stanchion.

In the cocked position, the spacing between portion 22 and stanchion 10 is advantageously either at least sufficient to accommodate tube 15 therepast, or coupler 20 is sufficiently flexible to let tube 15 be snapped in place (perhaps aiding in setting the coupler in its provisional location along slot 11). Optionally with appropriate dimensions, the extension 22 could be horizontal when the coupler 20 is cocked, and still adequately cradle tube 15 in the C-shaped portion 21.

After the vertical position of coupler 20 and tube 15 is properly adjusted, T-bolt 30 is inserted into T-slot 11 and nut 33 is turned down until tubing 15 is held snugly against stanchion 10, as illustrated in FIG. 3. It should be remarked that in the construction of the illustrated embodiment, extension portion 22 is rigidly, but resiliently jointed to C-shaped portion 21 so that T-bolt 30 is elastically coupled to the top end of C-shaped portion 21. Thus, nut 33 can be snugly tightened against this elasticity so that length of tubing 15 is firmly held against stanchion 10.

Another embodiment of this invention is shown generally in FIGS. 6-13. Elements that are the same in that embodiment as in the first-described embodiment are identified with the same reference characters, except primed, and a detailed description thereof is omitted.

Figures 6, 8, 9, 10:
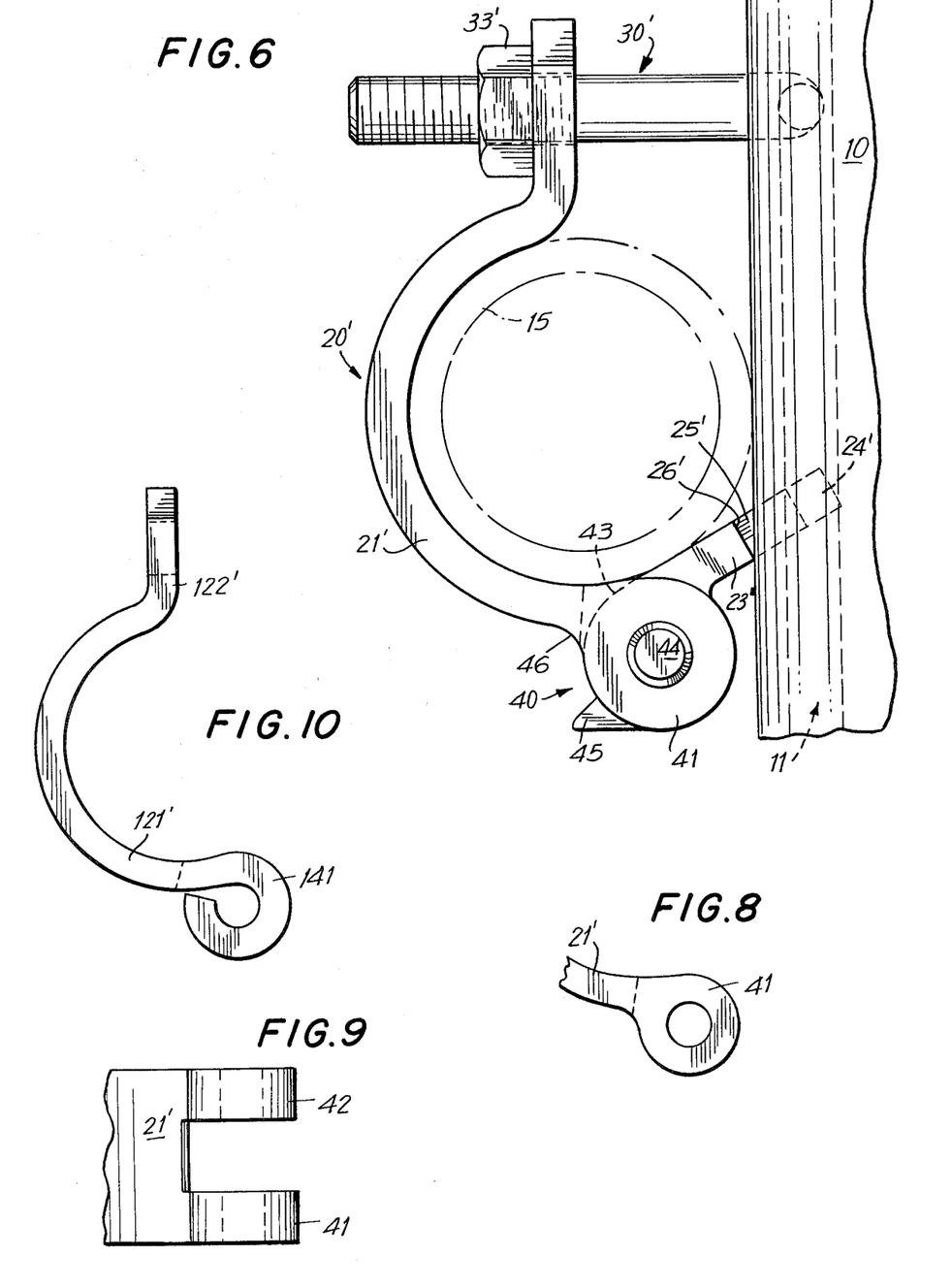
FIGS. 6 and 7 are side elevational views of an improved alternative hinged embodiment of this invention.
FIG. 8 is a side view of a portion of an extruded sickle-shaped member forming a part of the embodiment of FIGS. 6 and 7.
FIG. 9 is a top view of a portion of the member of FIG. 8.
FIG. 10 shows an alternative strap metal construction of the member of FIG. 8.
Figures 7, 11, 12, 13:
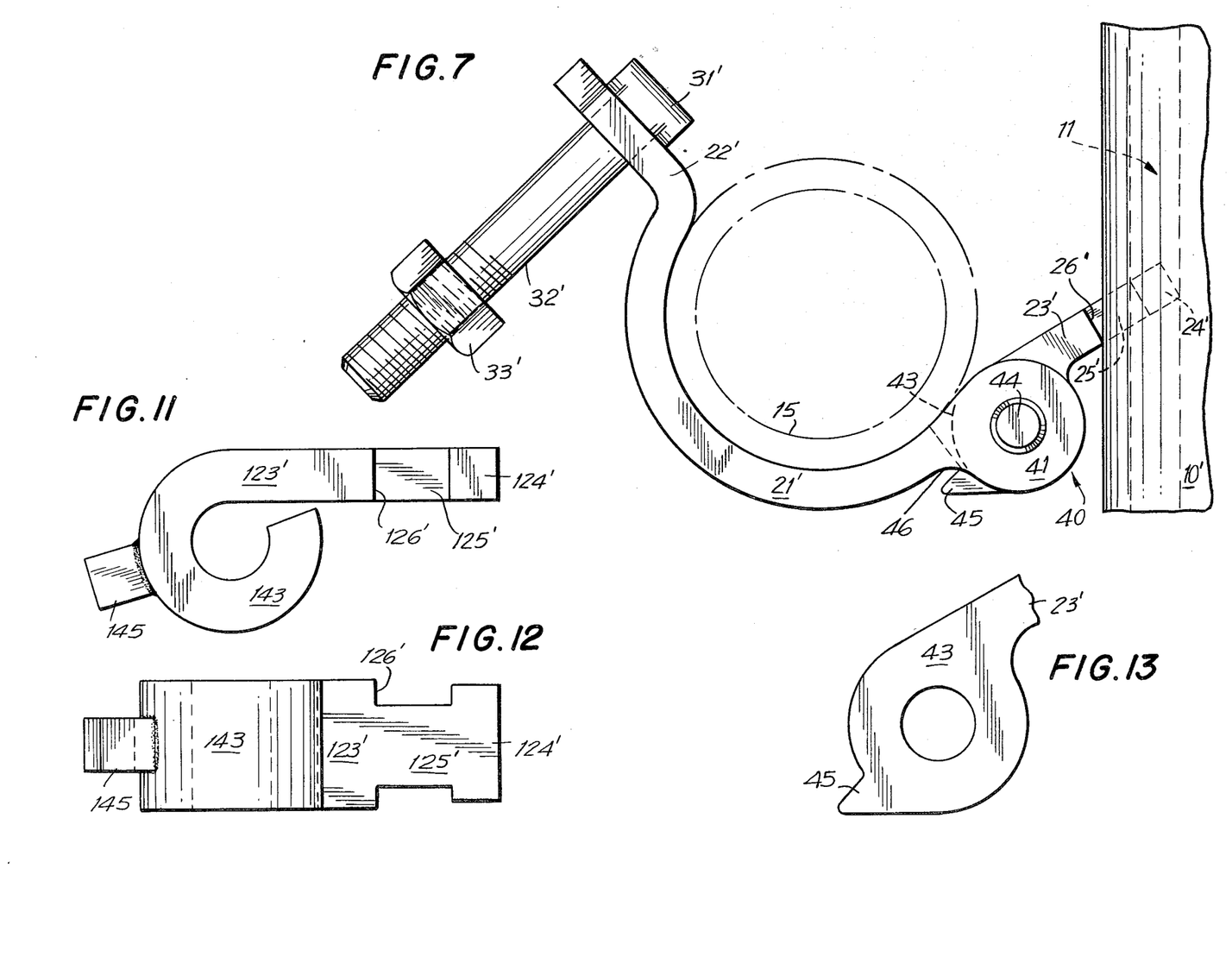
FIGS. 11 and 12 are side and top views, respectively, showing one construction of a hinged member and stop forming a part of the embodiment of FIG. 10.
FIG. 13 shows an alternative extruded construction similar to the member of FIG. 11, and forming a part of the embodiment of FIGS. 6 and 7.

As shown in FIGS. 6 and 7, coupler 20' includes a hinge 40 articulating member 23' and collar portion 21'. Hinge 40 is here formed of first and second eyes 41 ad 42 formed at the lower end of C-shaped collar portion 21', and a corresponding eye 43 formed at the end of T-shaped member 23' remote from head portion 24'. Eyes 41, 42, and 43 are joined together with a hinge pin 44 about which collar portion 21' and member 23' pivot. A spur 45 is here formed on eye 43 to abut against an edge 46 of the lower end collar portion 21' when element 23' is aligned tangentially from the curve of portion 21' (FIG. 7). Spur 45 is here disposed to abut against the outside of collar portion 21' (i.e., the side away from tubing 15).

In this embodiment, shoulders 26' are formed as a part of element 23' so that head portion 24' and shoulders 26' can maintain their biting relation to T-slot 11 regardless of the position of tubing 15 and collar portion 21'.

An advantage afforded by the arrangement of this embodiment is that coupler 20' does not slide in T-slot 11 as a workman tightens down T-bolt 30'. This is true because the biting engagement of head portion 24' and shoulders 26' with T-slot 11 is maintained both when length of tubing 15 is laid provisionally into C-shaped collar portion 21' (FIG. 7) and while T-bolt 30' or other fastening means is being engaged in T-slot 11 (FIG. 6). In other words, unlike the first-described embodiment 20 of this invention, coupler 20' by action of hinge 40 permits member 23' to maintain a slanting relation to I-slot 11 when T-bolt 30' is engaged into T-slot 11, even though the angle of collar portion 21' changes. As a result, the top edge of head portion 24' and the lower edges of shoulders 26' continue to bite into and maintain a purchase in T-slot 11.

The construction of coupler 20' also has the advantage of being simple and straightforward, although several variations of its construction are possible.

As shown in FIG. 10, C-shaped collar portion 121', extension portion 122' and eye 141 can be formed of a malleable material such as steel strap. In this case, the strap can be bent or forged into eye 141.

Alternatively, collar portion 21' can be formed by extrusion from an extrudable material such as aluminum alloy, in which case eyes 41 and 42 can be extruded with collar portion 21', as shown in FIGS. 8 and 9, as a single unit (then cut to form the eyes).

As shown in FIGS. 11 and 12, member 123' can also be formed of steel strap or other malleable material so that eye 143 is forged or bent at the end thereof distant from head and neck portions 124', 125' and shoulders 126'. In this variation, a block of metal 145 can be welded to eye 143 to form spur 145.

As shown in FIG. 13, member 23' is extruded from aluminum alloy or other extrudable material. In this version, a spur 45 can easily be formed by extrusion together with eye 43.

What is claimed is:

1. A coupler for joining a length of tubing to a shoring or scaffolding stanchion or other beam member having a vertical T-slot extending therealong, the coupler comprising
    collar means adapted to engage said tubing and to hold the same against said beam member, said collar means having first and second ends;
    engaging means formed at said first end of said collar means and adapted to be removably insertable into said T-slot and to hold said first end of the collar means in a given position along said T-slot; and
    securing means being adapted to be removably insertable into said T-slot and to engage said second end of said collar means and to be tightened so as to hold said length of tubing securely in place against said beam member in cooperation with said engaging means;
    wherein said engaging means further includes biting means at said first end of the collar means for provisionally engaging and gripping into at least one surface of said beam member when said coupler is hanging by said engaging means only in said T-slot to prevent said coupler from sliding in said vertical T-slot before said securing means has been engaged in said T-slot and tightened, and said collar means is shaped to cradle and support said tubing when said engaging means is provisionally engaged on said beam member without aid of said securing means.

2. A coupler according to claim 1, wherein said T-slot, in cross section, has an interior channel portion of a predetermined width and lips of predetermined thickness extending over said interior channel portion toward one another to define an entry channel portion of a width narrower than said predetermined width so that said interior channel portion and said entry channel portion together are substantially T-shaped in cross-section, said engaging means includes a T-shaped member having a head portion and a neck portion connecting said first end of the collar means to said head portion, said head portion having a broader length and a narrower width than said entry channel portion and having a shallower depth than said interior channel portion, said neck portion being narrower than said entry channel portion, so that said collar means can be secured at said first end thereof to said beam member by inserting said T-shaped member into said T-channel and twisting it to a position for said collar means to receive said tubing.

3. A coupler according to claim 2, wherein said engaging means further includes biting means at said first end of the collar means for provisionally engaging and gripping into at least one surface of said beam member to prevent said coupler from sliding in said T-slot before said securing means has been engaged in said T-slot and tightened, and said collar means is shaped to cradle and support said tubing when said engaging means is provisionally engaged on said beam member without aid of said securing means.

4. A coupler according to claim 3, wherein said biting means includes at least one shoulder on said first end of said collar means adapted to bite into said lips when said coupler is engaged in said T-slot only by said engaging means, for provisionally holding said tubing at a given position along said beam member.

5. A coupler according to claim 4, wherein the neck of said T-shaped member is sufficiently longer than the thickness of the lips of the T-slot so that said T-shaped member is adapted to be loosely engaged in said T-slot when said first end is at right angles thereto for slidable movement therein, and said neck is sufficiently short and said shoulder and said T-shaped member are shaped such that at least one of the latter are adapted to bite into said lips to hold said coupler provisionally at said given position when said head is engaged behind said lips and said first end is angled downwardly relative to said slot.

6. A coupler according to claim 5, wherein said T-shaped member and said shoulder are formed of a metal having a hardness greater than that of said beam member.

7. A coupler according to claim 6, wherein said collar means includes a cradle portion adapted to extend along a portion of the circumference of said tubing and having a shape corresponding to said portion of the circumference of the tubing.

8. A coupler according to claim 5, wherein said securing means includes a T-bolt having an elongated head portion adapted to be inserted into said T-slot and, when twisted a predetermined amount, to be held securely in said T-slot, and a threaded shank portion extending from said head portion; means on the second end of said collar means for receiving said shank portion; and a threaded nut for securing said T-bolt.

9. A coupler for joining a length of tubing to a shoring or scaffolding stanchion or other beam member having a T-slot extending therealong, the coupler comprising collar means adapted to engage said tubing and to hold the same against said beam member, said collar means having first and second ends;

engaging means formed at said first end of said collar means and adapted to be removably insertable into said T-slot and to hold said first end of the collar means in a given position along said T-slot;

securing means being adapted to be removably insertable into said T-slot and to engage said second end of said collar means and to be tightened so as to hold said length of tubing securely in place against said beam member in cooperation with said engaging means;

wherein a portion of said collar means is shaped to cradle and support said tubing when said coupler is engaged with said T-slot by said engaging means without aid of said securing means; and hinge means disposed between said engaging means and the portion of said collar means which is adapted to cradle said tubing.

10. A coupler for joining a length of tubing to a shoring or scaffolding stanchion or other beam member having a T-slot extending therealong, wherein said T-slot, in cross section, has an interior channel portion of a predetermined width and lips of predetermined thickness extending over said interior channel portion toward one another to define an entry channel portion of a width narrower than said predetermined width so that said interior channel portion and said entry channel portion together are substantially T-shaped in cross section, the coupler comprising collar means adapted to engage said tubing and to hold the same against said beam member, said collar means having first and second ends, wherein said collar means includes a cradle portion adapted to extend along a portion of the circumference of said tubing and having a shape corresponding to said portion of the circumference of the tubing;

engaging means formed at said first end of said collar means and adapted to be removably insertable into said T-slot and to hold said first end of the collar means in a given position along said T-slot; wherein said engaging means includes a T-shaped member having a head portion and a neck portion connecting said first end of the collar means to said head portion, said head portion having a broader length and a narrower width than said entry channel portion and having a shallower depth than said interior channel portion, said neck portion being narrower than said entry channel portion, so that said collar means can be secured at said first end thereof to said beam member by inserting said T-shaped member into said T-channel and twisting it to a position for said collar means to receive said tubing; and wherein said engaging means further includes biting means at said first end of the collar means for provisionally engaging and gripping into at least one surface of said beam member to prevent said coupler from sliding in said T-slot while said coupler is supported by said engaging means alone; said biting means including at least one shoulder on said first end of said collar means adapted to bite into said lips when said coupler is engaged in said T-slot only by said engaging means, for provisionally holding said tubing at a given position along said beam member, with the neck of said T-shaped member being sufficiently longer than the thickness of the lips of the T-slot so that said T-shaped member is adapted to be loosely engaged in said T-slot when said first end is at right angles thereto for slidable movement therein, and said neck is sufficiently short and said shoulder and said T-shaped member are shaped such that at least one of the latter is adapted to bite into said lips to hold said coupler provisionally at said given position when said head is engaged behind said lips and said first end is angled downwardly relative to said slot, with said T-shaped member and said shoulder being formed of a metal having a hardness greater than that of said beam member;

securing means being adapted to be removably insertable into said T-slot and to engage said second end of said collar means and to be tightened so as to hold said length of tubing securely in place against said beam member in cooperation with said engaging means, with a portion of said collar means being shaped to cradle and support said tubing when said engaging means is provisionally engaged on said beam member without aid of said securing means; and hinge means disposed between said biting means and the portion of said collar means which is shaped to cradle said tubing.

11. A coupler for joining a length of tubing to a stanchion having a vertical T-slot, comprising a sickle-shaped member that has a predetermined axial width and has, in axial cross section, a C-shaped portion and an extension portion at one end thereof extending radially outward; a T-shaped member extending tangentially from the other end of said C-shaped portion, having a head portion and a relatively narrow neck portion; a T-bolt having an elongated head and a shaft adapted to extend through said extension portion and be tightened thereon; and at least one shoulder on said C-shaped portion at the end thereof remote from said extension portion extending axially to cooperate with said head portion such that when said length of tubing is laid in said C-shaped portion while said T-shaped member engages said vertical T-slot but before said T-bolt is engaged in said T-slot and tightened said head portion and said shoulder bite into said T-channel for provisionally holding said coupler in position.

12. A coupler according to claim 11, wherein said head portion is narrower than the predetermined axial width of said sickle-shaped member.

13. A coupler according to either of claims 11 and 12, wherein the head portion of said T-shaped member has a thickness in the radial sense, no greater than the axial width of the neck portion.

14. A coupler according to claim 11, wherein said C-shaped portion includes at least one shoulder at the end thereof remote from said extension portion.

15. A coupler for joining a length of tubing to a stanchion having a T-slot, comprising a sickle-shaped member that has a predetermined axial width and has, in axial cross section, a C-shaped portion and an extension portion at one end thereof extending radially outward; a T-shaped member extending tangentially from the other end of said C-shaped portion, having a relatively narrow neck portion and a head portion axially broader than said neck portion, wherein said T-shaped member is hingedly connected to said other end of said C-shaped portion; and a T-bolt having an elongated head and a shaft adapted to extend through said extension portion and be tightened thereon.

16. A coupler according to claim 15, wherein said sickle-shaped member is formed of strap of malleable metal and said other end thereof is bent into an eye to hingedly receive said T-shaped member.

17. A coupler according to claim 15, wherein said sickle-shaped member is extruded from extrudable metal with an eye formed at said remote end thereof to hingedly receive said T-shaped member.

18. A coupler for joining a length of tubing to a shoring or scaffolding stanchion having a vertical T-slot extending therealong adapted to receive the head end and a portion of the shank of a bolt the coupler comprising
collar means extending part way around the circumference of said tubing to engage said length of tubing and to hold the same against said stanchion, said collar means having first and second ends;
engaging means formed at said first end of said collar means adapted to be insertable into said vertical T-slot to hold said first end of the collar means provisionally by achieving a provisional purchase against the stanchion with said coupler hanging by said engaging means, said provisional purchase preventing the coupler from sliding downwards in the T-slot, and to securely hold said first end in said T-slot after said collar means engages and supports said tubing;
securing means at the second end of said collar means permitting engagement of said second end with said T-slot for securing said collar means and said length of tubing firmly in place against said stanchion; and
means for preventing said engaging means from disengaging from said provisional purchase while said securing means is being engaged with said T-slot.

19. A coupler according to claim 18, wherein said T-slot, in cross section, has an interior channel portion of a predetermined width and lips extending over said interior channel portion towards one another to define an entry channel portion of a width narrower than said predetermined width so that said interior channel portion and said entry channel portion are substantially T-shaped; and said engaging means includes a T-shaped member having a head portion and a neck portion, the head portion and the neck portion being respectively broader and narrower than said entry channel portion in the direction across said stanchion when said collar means engages said tubing against said stanchion, said head portion being narrower than said entry channel portion in the direction along said stanchion, and further includes at least one shoulder extending laterally from said neck portion for provisionally engaging said T-slot, in cooperation with said T-shaped member, and preventing said coupler from sliding along said stanchion.

20. A coupler for joining a length of tubing to a shoring or scaffolding stanchion having a T-slot extending therealong adapted to receive the head end and a portion of the shank of a bolt the coupler comprising
collar means extending part way around the circumference of said tubing to engage said length of tubing and to hold the same against said stanchion, said collar means having first and second ends;
engaging means formed at said first end of said coller means adapted to be insertable into said T-slot to hold said first end of the collar means provisionally by achieving a provisional purchase against the stanchion and preventing the coupler from sliding in the T-slot, and to securely hold said first end in said T-slot after said collar means engages said tubing;
securing means at the second end of said collar means permitting engagement of said second end with said T-slot for securing said collar means and said length of tubing firmly in place against said stanchion; and
means for preventing said engaging means from disengaging from said provisional purchase while said securing means is being engaged with said T-slot, wherein said means for preventing includes hinge means articulately joining said engaging means to said collar means so that said engaging means remains in provisional engagement with said T-slot at least while said length of tubing is engaged by said collar means until said securing means secures said collar means and the length of tubing engaged therewith against said T-slot.

21. A coupler according to claim 20, wherein said hinge means is formed of at least one eye at the first end of said collar means, at least one corresponding eye formed on said engaging means, and pivot means extending through said eyes.

22. A coupler according to claim 21, wherein said collar means is formed of steel strap and said at least one eye therein is formed by bending said strap.

23. A coupler according to claim 21, wherein said engaging means is formed of steel strap, and said at least one corresponding eye is formed by bending the strap.

24. A coupler according to claim 21, wherein at least a portion of said collar means is formed of an extrudable material, and said at least one eye therein is extruded.

25. A coupler according to claim 21, wherein said engaging means is formed of an extrudable material, and said at least one corresponding eye is extruded.

26. A coupler according to claim 21, wherein at least one of said eye and said corresponding eye has a spur formed thereon to engage a respective one of said engaging means and said collar means to limit the angle of movement of said hinge means.

27. A coupler according to claim 25, wherein said spur is extruded on said corresponding eye in a position to engage a part of said collar means remote from the tubing engaged therewith.

28. A coupler according to claim 23, wherein said spur is welded to said corresponding eye in a position to engage a part of said collar means remote from the tubing engaged therewith.

29. A coupler according to claim 20, wherein said hinge means includes stop means for limiting the angle of movement of said hinge means so that said collar means is maintained at a predetermined distance from said T-slot when said engaging means engages said T-slot but said securing means has not secured said collar means and said tubing against said T-slot.

30. In combination, a shoring or scaffolding stanchion having a vertical T-slot extending therealong adapted to receive the head end and a portion of the shank of a bolt, and a coupler, the coupler comprising
collar means extending part way around the circumference of tubing to engage said length of tubing and to hold the same against said stanchion, said collar means having first and second ends;
engaging means formed at said first end of said collar means adapted to be insertable into said vertical T-slot to hold said first end of the collar means provisionally by achieving a provisional purchase against the stanchion and preventing the coupler from sliding in the T-slot, and to securely hold said first end in said T-slot after said collar means engages said tubing;
securing means at the second end of said collar means permitting engagement of said second end with said T-slot for securing said collar means and said length of tubing firmly in place against said stanchion; and
means for preventing said engaging means from disengaging from said provisional purchase while said securing means is being engaged with said T-slot.

31. A coupler according to claim 9, wherein said engaging means further includes biting means at said first end of the collar means for provisionally engaging and gripping into at least one surface of said beam member to prevent said coupler from sliding in said T-slot before said securing means has been engaged in said T-slot and tightened, so that when said collar means is supporting said tubing, the coupler is provisionally engaged on said member without aid of said securing means.

* * * * *